Patented Jan. 24, 1928.

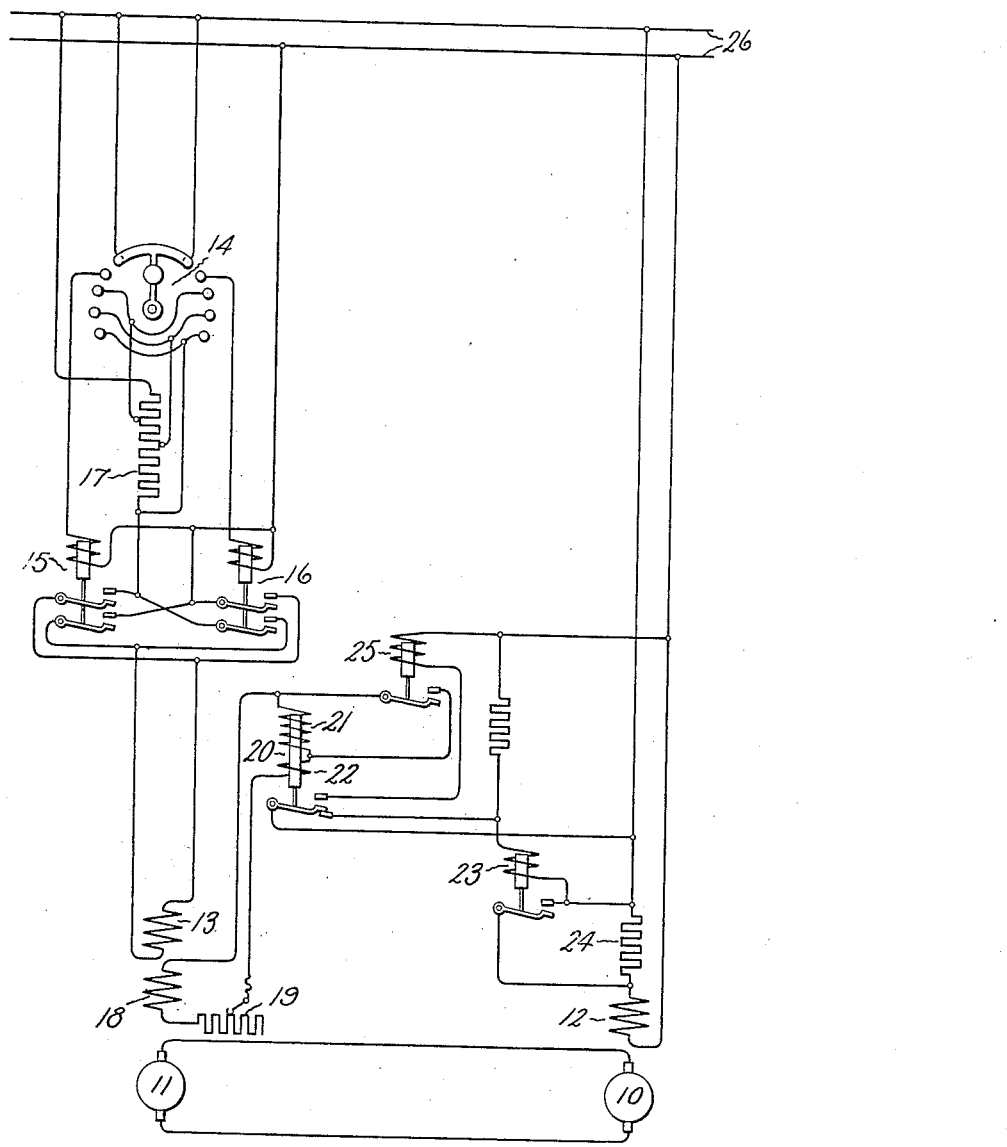

1,657,239

UNITED STATES PATENT OFFICE.

CHARLES C. CLYMER, OF SCHENECTADY, NEW YORK, ASSIGNOR TO GENERAL ELECTRIC COMPANY, A CORPORATION OF NEW YORK.

MOTOR CONTROL.

Application filed December 23, 1926. Serial No. 156,715.

My invention relates to improvements in the control of electric motors, particularly electric motors operating in what is known as the Leonard system, in which a separately excited generator has its armature connected in a local circuit with the armature of a separately excited motor, the speed control of the motor being obtained primarily by controlling the energization of the generator field winding.

The present invention is more particularly directed to improvements in the Leonard system for which Max A. Whiting, filed an application for Letters Patent of the United States, Serial No. 704,059, on April 13, 1924, and for which Max A. Whiting and Elliott D. Harrington filed an application for Letters Patent of the United States, Serial No. 83111, on Jan. 22, 1926, on an improvement of the system of the said Whiting application. The said applications are assigned to the same assignee as is the present application.

The Leonard system is now being successfully applied to the driving of electric elevators and this invention is particularly applicable to such systems of elevator drive, although the invention is not necessarily limited thereto.

As explained in the said Whiting application and the said Whiting and Harrington application, in the operation of high-speed elevators the preferred rates of acceleration and retardation are so high, and the stored energy of motion of the car and associated machinery are so considerable that the ordinary type of electric motor driving apparatus possesses certain undesirable speed characteristics associated with the acceleration and retardation. The elevator motor, particularly if of the gearless type, has almost inevitably a relatively high armature reaction, tending therefore to a serious loss of torque per ampere during the momentary overloads attendant upon acceleration and retardation. The gearless elevator motor has also almost inevitably a relatively high resistance of its armature circuit.

As a consequence, a drive of this nature tends to have the following undesirable characteristics:

The rate of acceleration for an overhauling load is considerably more rapid than for a "motoring" load (i. e. a load requiring power from the motor). The rate of retardation of an overhauling load is considerably slower than for a "motoring" load. In accelerating, the weakening of the elevator motor flux by reason of armature reaction persists momentarily after the cessation of the overload current, hence the speed, particularly at balanced or overhauling load, tends to increase momentarily above the normal full speed corresponding to the elevator load at the time; that is to say, the motor speed "overshoots".

When a means is used, such as a direct or an indirect cumulative compounding of the generator for improving the speed regulation of the motor at full-speed position of the controller, this tendency of the motor speed to "overshoot" is accentuated. Under this condition the compounding effect, which is wanted particularly at the sustained speed, tends to be strongly effective during accelerating overloads. By reason of the inherent sluggishness of the generator field such strong compounding effect exerted during acceleration persists momentarily after the accelerating overload is past, and the excess of generator excitation thus persisting causes a further tendency of the motor speed to "overshoot".

One of the objects of the said Whiting invention and the said Whiting and Harrington invention is to improve the stability of the motor which drives the elevator or other machinery and to increase the accuracy of its response to controller movements when operated at the rapid rates of acceleration and retardation under which the described difficulties tend to occur.

In the said Whiting application there is broadly claimed a system in which an electromagnetic switch governs the energization of the separately excited generator field winding in response to the rate of change of the flux set up by said winding so as to automatically regulate the voltage of the generator to improve the stability of the motor supplied with current from said generator.

In the system of control of said Whiting and Harrington application, an electromagnetic switch operates to automatically control either the energization of the Leonard generator separately excited field winding or the energization of the separately excited field winding of the motor, or the energization of both of said field windings. The automatic operation of said switch is effected in response to the rate of change of the field flux of the Leonard generator by energizing the switch from a damping local circuited winding on the generator. An increase of the torque per ampere exerted by the motor while accelerating and retarding rapidly, over that ordinarily obtained, is thus secured and the responsiveness of the motor to controller movements is improved as well as motor current peaks being reduced. The tendency of the motor to "over-shoot" is minimized, and the difference in the rates of acceleration at different loads and the differences in rates of retardation at different loads are also minimized.

While the system of the said Whiting and Harrington application is entirely practical and operative, it leaves something to be desired in that the effect of the damping winding of the generator is desirable up to approximately 85% of the full speed of the motor and after that it is not desired as it reduces materially the rate of acceleration. This effect is also experienced during retardation of the motor speed. Also if only fractional speeds are desired, this damping effect on the variation of the effective generator field flux causes an objectionable limitation in the acceleration of the motor. For instance, as applied to an elevator. when attempting to inch the elevator to a floor landing in the hoisting direction with full load in the car, the car will sometimes settle back or drop an appreciable and objectionable extent before the motor picks up its load and begins the hoisting operation.

The principal object of this invention is to eliminate the above mentioned objectionable features and nevertheless retain the advantageous features of the Whiting and Harrington system.

In carrying my invention into effect in the form which I now regard as the preferred form thereof, I provide means for automatically regulating the time constant of the generator field so as to obtain desired acceleration and retardation characteristics for the motor, the means provided for this purpose being preferably so designed and connected as to increase the time constant of the generator field if the rate of change of the field flux is above a predetermined maximum and tending to effect a decrease of the time constant of the generator field if this rate is below a predetermined minimum, within the limiting values of generator field flux corresponding to the position in which the controller is placed. I also provide means, which under the normal conditions of operation of an electric elevator, for example, is responsive to a function varying substantially in accordance with the rate of acceleration or the rate of retardation of the motor for strengthening the motor field during acceleration and retardation, the said means being so designed as to effect a continuation of the motor field strengthening for a limited time after the acceleration or retardation of the motor has substantially ceased. Since during the normal conditions of operation of the elevator the speed of the elevator motor is dependent on the voltage of the generator of the Leonard drive, and since the generator voltage is dependent on the value of the generator field flux, the speed of the motor may be said to be dependent on the value of the generator field flux. Specifically, the control is so constructed and arranged that the damping effect of the damping winding of the generator is caused to be initially relatively small and is then automatically permitted to increase. When this damping effect is permitted to increase, the motor field is caused to be automatically strengthened and when the field flux of the generator has become a substantially constant value, the damping effect is practically eliminated, and an interval of time thereafter the excitation of the motor is automatically reduced. A cooperation between the control of the time constant of the generator field and the regulation of the motor field energization is thus obtained whereby the desirable results of the invention are obtained.

For a better understanding of my invention, reference is had to the accompanying drawing, in which the invention is shown in simple diagrammatic form for the purpose of explaining the principles thereof. In the drawing, the Leonard drive is represented conventionally, the elevator driving motor having an armature 10 included in the local circuit with the armature 11 of the generator. The motor is provided with a separately excited field winding 12 and the generator is provided with a separately excited field winding 13. The controller for the generator field winding 13 includes the manually operable master switch 14, the electromagnetic directional switches 15 and 16 and the resistor 17 which is varied by means of the master switch. The arrangement thus far described is the customary Leonard drive, in which the direction of operation and speed variation of the motor is governed by suitable operation of the controller.

The generator is provided with a damping field winding 18 which may either be wound on the same poles as the field winding 13, or may be wound on suitable poles interposed between the poles in which the main field winding 13 is wound, it being merely necessary that the damping winding be inductively related to the main winding 13. The damping winding 18 is included in a local circuit which includes the adjustable resistor 19 and the windings of electromagnetic switch 20. The windings of this switch 20 comprise two parts, one part 21 being of a comparatively large number of turns of relatively small wire and the part 22 being of a comparatively few turns of relatively heavy wire. The switch 20 is provided with a movable switch member which is biased so as to normally shunt the winding of electromagnetic switch 23 which is provided for shunting a resistor 24 included in the circuit with the field winding 12. When the switch 20 operates its movable switch member to its upper position, it opens the shunt about the winding of switch 23, permitting a sufficient energization of switch 23 to close and shunt the resistor 24. In the upper position of the switch member of switch 20, the winding of switch 25 is energized. This switch 25 operates when energized to shunt the portion 21 of the windings of switch 20.

As thus constructed and arranged, and with the parts in their respective positions indicated, the operation of the system is as follows: Assume that the master switch 14 is thrown toward either the right or the left to its second operative position, for example, the corresponding directional contactor 15 or 16 will close and the separately excited generator field winding 13 will be connected to its source of supply 26 through the variable resistor 17. At this time the two portions 21 and 22 of the winding of switch 20 will be included in the local circuit in which the damping field winding 18 is included, and by reason of the relatively high resistance of the portion 21, there will be initially a relatively small damping effect caused by generator field winding 18. In other words, there will be temporarily permitted an initial relatively high rate of increase of the flux set up by the field winding 13 because of the comparatively small time constant of the generator field. This is desirable, since a temporary relatively high rate of increase of the generator field flux, and correspondingly the generator voltage, will prevent the settling back of the load driven by the motor. When the rate of change of the generator field flux is above a predetermined value, there will be such a current flowing through the damping field winding that the electromagnetic switch 20 will be operated to its upper position. This switch has inherently a certain small time interval of operation which is not detrimental to the intended functioning of the system, and is rather desirable. When the movable switch member of switch 20 leaves its lower position, it opens the shunt about the winding of switch 23 so that this winding will receive sufficient energization to effect operation of switch 23 and cause the shunting of resistor 24. The shunting of resistor 24 will effect an increase of the energization of the separately excited motor field 12, and this is desirable, as it provides a high torque value for the motor during the time of acceleration. The respective inherent small time intervals of operation of the switches 20 and 25 are desirable in the functioning of the system.

When the switch 20 makes engagement with its upper set of contacts, it energizes the electromagnetic switch 25 to close and shunt the high resistance portion 21 of the windings of switch 20. This will effect a reduction of the resistance of the local circuit in which the damping field winding 18 is included and the damping effect of winding 18 will be materially increased, thereby increasing the time constant of the generator field, so that a reduction in the rate of increase of the generator field flux is effected. This is desirable, since the rate of increase of the voltage supplied to the motor armature is thus limited so as to avoid an undesirably high value. The holding effect of the portion 22 of the windings of switch 20 will be sufficient at this time to maintain the switch member of switch 20 in its upper position.

When the current in the damping field winding 18 approaches a lower value, as is occasioned by the current in the separately excited generator field winding 13 approaching a substantially constant value, the portion 22 of the windings of switch 20 will not be sufficiently energized to maintain the movable contact of switch 20 in its upper position. The switch 20 will therefore drop open and close its lower set of contacts. In dropping open the winding of switch 25 is deenergized and switch 25 opens and includes the high resistance portion 21 of the windings of switch 20 in the circuit with damping field winding 18, thereby reducing the time constant of the generator field. This is desirable, since at this time it is preferable that the effect of the damping winding 18 be practically removed.

When the switch 20 closes its lower set of contacts, it will shunt the winding of switch 23. Switch 23 will not immediately open, because of the fact that the winding of this switch is included in a local circuit and the magnetic flux of the switch will persist for a substantially definite interval of time. During this interval of time, the resistor 24 will be maintained shunted. This is desirable, since a relatively high energization of the separately excited motor field winding 12 is maintained for a substantial interval of time after the field flux of the generator has substantially ceased changing. The operations described above occur in a relatively rapid sequence.

The advantageous features of my invention are likewise to be had when the master switch 14 is operated so as to decrease the energization of the generator seperately excited field 13 and thus cause the motor speed to decrease. That is because of the fact that the functioning of the switches 20, 23 and 25 is caused to be in accordance with the rate of change of the field flux of the generator and these switches funnction in the described manner, regardless of whether the energization of the separately excited generator field is quickly increased or quickly decreased.

The advantageous features of my invention are had in response to relatively rapid movements of the master switch 14. However, the advantageous features of the invention are present and the equipment will function to obtain proper acceleration and retardation characteristics and the limitation of peaks in the current supplied to the motor for all operations of the master switch, although if the master switch is operated slowly, the advantages of the invention are not so pronounced. The invention permits a rapid manipulation of the master switch without producing undesirable acceleration and retardation characteristics for the motor and without producing objectionable motor armature current peaks.

What I claim as new and desire to secure by Letters Patent of the United States is:

1. In combination, a generator having a field winding, a controller for varying the energization of said winding, and electroresponsive operating means interconnected with said winding to respond to the rate of change of the flux set up by said winding, the said means being constructed and arranged to automatically effect an increase of the time constant of the field set up by said winding in response to a rate of change of said flux in excess of a predetermined value and to automatically effect a decrease of the time constant of the field set up by said winding when the said rate is reduced below a predetermined minimum.

2. In combination, a generator having a field winding, a substantially constant potential source of supply for said winding, a controller included in the connections between said source and said winding for varying the energization of said winding, and electroresponsive means connected to automatically respond to the rate of change of the flux set up by said winding for permitting an initial relatively high rate and then automatically increasing the time constant of the field set up by said winding.

3. In combination, a generator having a main field winding, a controller for varying the energization of said winding, a damping field winding included in a local circuit, and electroresponsive means connected to respond to the current in said damping field winding for automatically varying the resistance of said circuit responsively to the rate of change of the flux set up by said main field winding.

4. In combination, a generator having a field winding, a controller for varying the energization of said winding, a damping field winding, and means governed responsively to the rate of change of the flux set up by said first field winding for automatically regulating the effect of said damping winding to permit an initial high rate and then limit the rate to a lower value.

5. In combination in a Leonard system, a damping winding on the generator inductively related to the separately excited generator field winding, the said damping winding being included in a local circuit, and means energized responsively to the current in said circuit for automatically regulating the value of the current in said damping field winding to control the speed of the motor associated with said generator.

6. In combination in a Leonard system, a resistor in the circuit of the separately excited motor field winding, and electroresponsive means responsive to the rate of change of the flux set up by the separately excited generator field winding for regulating said resistor, the said means being constructed and arranged to automatically effect the shunting of said resistor while there is a substantial rate of change of said flux and then reinsert said resistor a substantial interval of time after the said flux has substantially ceased changing.

7. In combination in a Leonard system, means for governing the energization of the separately excited motor field winding, and electroresponsive means responsive to the rate of change of the flux set up by the separately excited generator field winding for automatically regulating the said rate and for automatically governing said first mentioned means, the said means being constructed and arranged to permit an initial relatively high rate of change of the flux set up by said generator field winding, then effect a limitation of said rate to a lower value and through said first mentioned means to effect an increase of the energization of said motor field winding, and then effect a reduction of the energization of said motor field winding a substantial interval of time after the flux set up by said generator field winding becomes substantially constant.

8. In combination in a Leonard system, a controller for governing the separately excited generator field winding, a damping winding for said generator included in a local circuit, a resistor in the circuit of the motor field winding, an electromagnetic switch for shunting said resistor, a second electromagnetic switch having its winding included in the circuit of said damping field winding and provided with contacts normally shunting the winding of said first electromagnetic switch, and connections through which said second electromagnetic switch effects a reduction of the resistance of the said local circuit and the energization of said first electromagnetic switch to shunt said resistor when the rate of change of the field flux of said generator reaches a predetermined maximum value and then effects an increase of the resistance of said local circuit and the shunting of the winding of said first electromagnetic switch when the rate of change of the generator field flux has reduced to a predetermined value.

9. The method of regulating the rate of change of the field flux of a generator of a Leonard drive to regulate the operation of the motor, which comprises increasing the time constant of the generator field to reduce said rate a short interval after the separately excited generator field winding is connected to its source of supply, and then decreasing said time constant to increase the said rate when the rate reduces below a predetermined value.

10. The method of governing the speed of the motor of a Leonard system, which comprises permitting for a short interval the relatively high initial rate of change of the generator field flux occasioned by the connection of the separately excited generator field winding to its source of supply, then automatically reducing said rate and increasing the energization of the separately excited field winding of the motor and maintaining said increase for a substantial interval of time after the field flux of the generator has become substantially constant.

11. The method of governing the speed variation of the motor of a Leonard drive which comprises automatically increasing the field flux of the motor after the field winding of the generator is connected to its source of supply and then reducing the field flux of the motor a substantial interval of time after the rate of change of the field flux of the generator has reduced to a predetermined minimum value.

12. The method of governing the speed variation of the motor of a Leonard drive, which comprises permitting for a short interval the relatively high rate of change of the generator field flux occasioned by the connection of the separately excited generator field winding to its source of supply, then automatically reducing said rate and increasing the energization of the separately excited motor field winding, then effecting an increase of said rate when the rate reduces to a predetermined value and a definite time thereafter reducing the energization of the separately excited motor field winding.

In witness whereof, I have hereunto set my hand this 22nd day of December, 1926.

CHARLES C. CLYMER.